(12) United States Patent
Lyon

(10) Patent No.: US 6,470,437 B1
(45) Date of Patent: Oct. 22, 2002

(54) UPDATING AND INVALIDATING STORE DATA AND REMOVING STALE CACHE LINES IN A PREVALIDATED TAG CACHE DESIGN

(75) Inventor: Terry L Lyon, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/466,306

(22) Filed: Dec. 17, 1999

(51) Int. Cl.$^7$ .............................................. G06F 12/10
(52) U.S. Cl. ...................... 711/207; 711/144
(58) Field of Search ................. 711/108, 201, 711/206–207, 144–145; 712/204

(56) References Cited

U.S. PATENT DOCUMENTS

| 5,859,999 A | 1/1999 | Morris et al. ................ 712/224 |
| 5,860,017 A | 1/1999 | Sharangpani et al. ......... 712/23 |
| 6,014,732 A * | 1/2000 | Naffziger .................... 711/203 |

FOREIGN PATENT DOCUMENTS

EP    0 911 737   *  4/1999

OTHER PUBLICATIONS

Wolfe, A., "Patents shed light on Merced's Innards", Electronic Engineering Times, Feb. 15, 1999, pp. 43–44.

* cited by examiner

Primary Examiner—Matthew Kim
Assistant Examiner—Denise Tran

(57) ABSTRACT

In a computer architecture using a prevalidated tag cache design, logic circuits are added to enable store and invalidation operations without impacting integer load data access times and to invalidate stale cache lines. The logic circuits may include a translation lookaside buffer (TLB) architecture to handle store operations in parallel with a smaller, faster integer load TLB architecture. A store valid module is added to the TLB architecture. The store valid module sets a valid bit when a new cache line is written. The valid bit is cleared on the occurrence of an invalidation operation. The valid bit prevents multiple store updates or invalidates for cache lines that are already invalid. In addition, an invalidation will block load hits on the cache line. A control logic is added to remove stale cache lines. When a cache line fill is being processed, the control logic determines if the cache line exists in any other cache segments. If the cache line exists, the control logic directs the clearing of store valid bits associated with the cache line.

12 Claims, 8 Drawing Sheets

UPDATING AND INVALIDATING STORE DATA AND REMOVING STALE CACHE LINES IN A PREVALIDATED TAG CACHE DESIGN

TECHNICAL FIELD

The technical field encompasses computer systems employing prevalidated cache tag designs. In particular, the technical field encompasses designs to support store updates and invalidates and removal of stale cache lines out of a cache.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is transparent to a computer program at the instruction level and can thus be added to a computer architecture without changing the instruction set or requiring modification to existing programs.

A cache hit occurs when a processor requests an item from a cache and the item is present in the cache. A cache miss occurs when a processor requests an item from a cache and the item is not present in the cache. In the event of a cache miss, the processor retrieves the requested item from a lower level of the memory hierarchy. In many processor designs, the time required to access an item for a cache hit is one of the primary limiters for the clock rate of the processor if the designer is seeking a single cycle cache access time. In other designs, the cache access time may be multiple cycles, but the performance of a processor can be improved in most cases when the cache access time in cycles is reduced. Therefore, optimization of access time for cache hits is critical for the performance of the computer system.

Associated with cache design is a concept of virtual storage. Virtual storage systems permit a computer programmer to think of memory as one uniform single-level storage unit but actually provide a dynamic address-translation unit that automatically moves program blocks on pages between auxiliary storage and the high speed storage (cache) on demand.

Also associated with cache design is the concept of fully associative or content-addressable memory (CAM). Content-addressable memory is a random access memory that in addition to having a conventional wired-in addressing mechanism also has wired-in logic that makes possible a comparison of desired bit locations for a specified match for all entries simultaneously during one memory-cycle time. The specific address of a desired entry need not be known since a portion of its contents can be used to access the entry. All entries that match the specified bit locations are flagged and can be addressed the current or on subsequent memory cycles.

Memory may be organized into-words (for example 32 bits or 64 bits per word). The minimum amount of memory that can be transferred between a cache and the next lower level of memory hierarchy is called a line or a block. A line may be multiple words (for example, 16 words per line). Memory may also be divided into pages or segments with many lines per page. In some computer systems page size may be variable.

In modern computer memory architectures, a central processing unit (CPU) produces virtual addresses that are translated by a combination of hardware and software to physical addresses. The physical addresses are used to access physical main memory. A group of virtual addresses may be dynamically assigned to each page. Virtual memory requires a data structure, sometimes called a page table, that translates the virtual address to the physical address. To reduce address translation time, computers may use a specialized associative cache dedicated to address location, called a translation lookaside buffer (TLB).

A cache may include many segments, or ways. If a cache stores an entire line address along with the data and any line can be placed anywhere in the cache, the cache is said to be fully associative. For a large cache in which any line can be placed anywhere, the hardware required to rapidly determine if and where an item is in the cache may be very large and expensive. For larger caches a faster, space saving alternative is to use a subset of an address (called an index) to designate a line position within the cache, and then store the remaining set of the more significant bits of each physical address, called a tag, along with the data. In a cache with indexing, an item with a particular address can be placed only within a set of lines designated by the index. If the cache is arranged so that the index for a given address maps exactly to one line in the subset, the cache is said to be direct mapped. If the index maps to more than one line in the subset, or way, the cache is said to be set-associative. All or part of an address may be hashed to provide a set index that partitions the address space into sets.

With direct mapping, when a line is requested, only one line in the cache has matching index bits. Therefore, the data can be retrieved immediately and driven onto a data bus before the computer system determines whether the rest of the address matches. The data may or may not be valid, but in the usual case where the data is valid, the data bits are available on the data bus before the computer system determines validity. With set associative caches, the computer system cannot know which line corresponds to an address until the full address is compared. That is, in set-associative caches, the result of tag comparison is used to select which line of data bits within a set of lines is presented to the processor.

In a cache with a TLB, the critical timing path for a hit requires a sequence of four operations: 1) a virtual tag must be presented to a CAM in the TLB to determine the location of a corresponding physical tag in random access memory in the TLB; 2) the physical tag must then be retrieved from the TLB random access memory (RAM); 3) the physical tag from the TLB RAM must then be compared to physical tag's access from the tag section of the cache; and 4) the appropriate data line must be selected. The sequence of four operations required to read the cache and can be a limiter to processor frequency and processor performance.

SUMMARY

A prevalidated tag cache holds hit information from a translation lookaside buffer (TLB) instead of address information, as is the conventional practice. That is, when a virtual address is provided to the TLB, instead of a physical address being provided as an output from the TLB, TLB hit bits are provided. The TLB hit bits are then compared to a prevalidated cache tag (containing TLB hit information) to determine if a cache hit or a cache miss has occurred. The TLB may be small, for example 32 entries, to enhance processing speed. The TLB may be used for operations requiring lower latency, such as integer load operations.

The small TLB presents a potential problem of thrashing, i.e., swapping out pages, or TLB entries, for example, which will degrade the performance of the cache. Because the TLB is small, TLB entries may be removed very quickly, which effectively results in loss of data out of the cache. That is, the prevalidated cache tags include hit information of the TLB, and not physical addresses so that when a TLB entry changes, the hit information is no longer valid, and any data associated with the old TLB entry is lost.

In this micro-architecture, to keep the TLB entries small, and to prevent thrashing of the TLB, a separate and larger TLB may be added to process operations that can be handled with a higher latency, such as store operations. The larger TLB can also provide higher bandwidth for floating point operations, for example. TLB entries required to be in the small TLB may be restricted, for example, to the TLB entries required for integer loads, while all other TLB entries are diverted to the larger TLB. The TLBs operate in parallel. Further, all exception and privilege checking may be performed in the large TLB, which also acts to reduce integer load access time. Use of this parallel TLB architecture has the added benefit of reducing pipeline stalls that might otherwise occur if the small and the large TLB were accessed in a series fashion.

As a further consequence of the cache tags having only TLB hit information instead of physical addresses, a mechanism may be provided to update and invalidate cache lines and remove stale cache lines. A store valid module may be added to the TLB architecture. The store valid module sets a store valid bit when a new cache line is written. The store valid bit is cleared on the occurrence of an invalidation operation, including new TLB entries and hardware failure recovery operations. The valid bits prevent multiple store updates or invalidations for cache lines that are already invalid.

A parallel cache tag array may be added to hold physical addresses of the cache lines. The cache tag array is functionally in parallel with the prevalidated cache tags that hold the TLB hit bits. A physical address cache tag is read out of the cache in the same manner as for the prevalidated cache tags, using an index contained in the input address. The addition of the large TLB includes a new address pipeline that is independent of the load address pipeline. The addition of this pipeline provides greater bandwidth for the cache without impacting load access latency. In operation, the store addresses are inputted to the large TLB and the cache tag independent of operations in the load data pipelines. If the store address is a physical address, the address is bypassed around the large TLB and is inputted into a physical address multiplexer. If the store address is a virtual address, then the large TLB is accessed and the physical address is translated by the large TLB. The physical address from the store instruction is then compared with the physical address read out of the cache tag array. If the two addresses match, then a way hit is generated and the store update hardware will update or invalidate the data cache in a later pipeline stage.

DESCRIPTION OF THE DRAWINGS

The invention will be described with reference to the following drawings in wherein like numerals refer to like items, and wherein.

DETAILED DESCRIPTION OF THE INVENTION

A cache having a TLB in which physical tags do not need to be retrieved from the TLB may improve the overall time for the critical path for accessing caches with TLBs. In such a design, instead of storing physical tags in a cache, the cache stores a location within the TLB where the physical tag is stored. The TLB may include two or more CAMs. For a cache hit, one of the CAMs in the TLB may generate a vector that specifies a location within the TLB where the physical address is stored. The vector may be compared to a location vector stored in the cache. The comparison of location vectors provides sufficient information to enable selection of one data line within a set without having to actually retrieve the physical address. As a result, a substantial time consuming operation (physical address retrieval) is removed from the critical time path of a cache hit. In addition, comparing location vectors rather than physical tags enables use of comparison logic that is faster and simpler than convention digital comparators.

Figure 1:
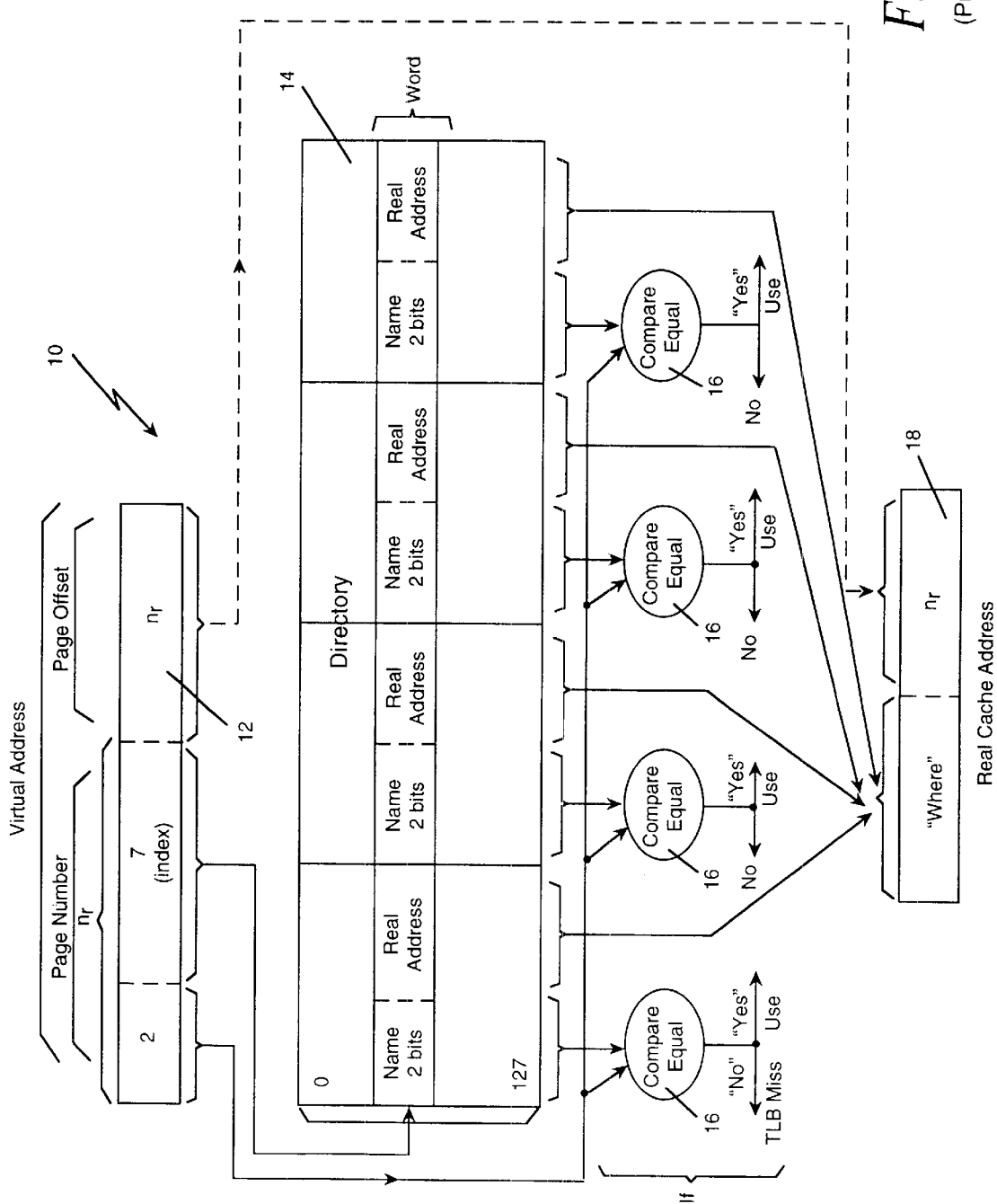
FIGS. 1 and 2 illustrate prior art cache micro-architectures.

FIG. 1 illustrates an example of a prior art cache. The system 10 includes a virtual address 12, a random access memory array 14, a comparator 16 and a physical address register 18. The system 10 employs set associative logic. The random access array 14 includes a total of 128 (four) entries requiring two virtual page address bits. Each set of four entries is part of one physical word (horizontal) of the random access array, so that there are 128 such words, requiring seven address index bits. The total virtual page number address n=9 must be used in the address translation to determine if and where the cache page resides. Lower order bits n, which represent the byte within the page, need not be translated. Seven virtual bits are used to select directly one of the 128 sets. Words read out of the set are compared simultaneously with the virtual addresses, using the comparator 16. If one of the comparisons gives a "yes," then the correct real or physical address of the page in the cache, which resides in the random access array, is gated to the physical cache-address register 18. The physical address is used on a subsequent cycle to obtain the correct information from the cache array (not shown).

Figure 2:
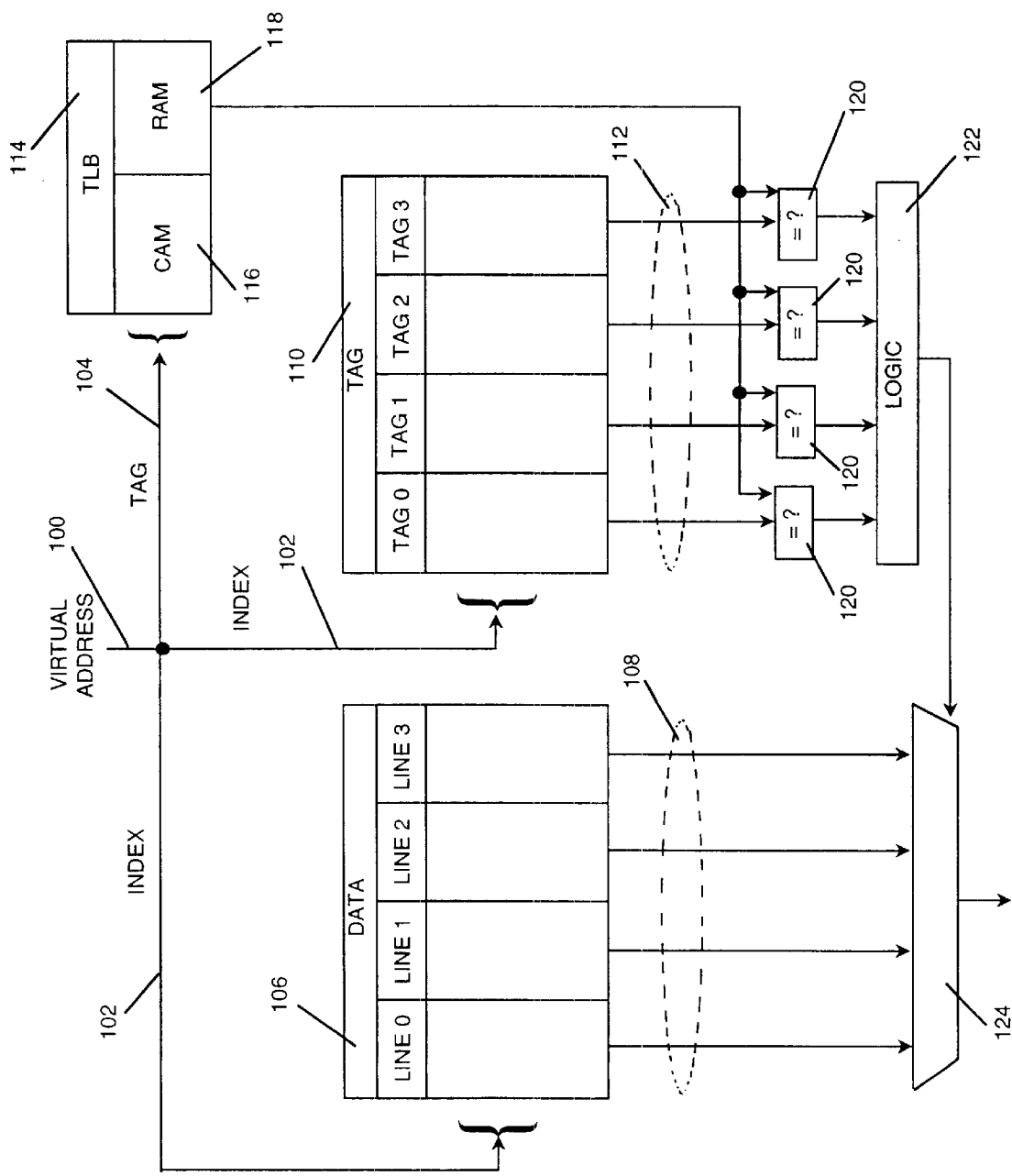

FIG. 2 illustrates another prior art cache. Four-way set-associative caches are used for illustration. A virtual address 100 comprises lower order index bits 102 and upper order (virtual) tag bits 104. The index bits 102 are typically the same for the virtual address and the physical address. The index bits 102 are used to select one set of lines of data in a data section 106 of the cache. The output of the data section 106 is four lines of data 108. The index bits 102 are also used to select a set of physical tags in a tag section 110 of the cache. The output of the tag section 110 is four physical tags 112, each corresponding to one data line 108. The virtual tag bits 104 are used to select one entry in a CAM 116 within a TLB 114. The TLB 114 stores both virtual and physical tags. If the virtual tag bits 104 do, not find a match in the CAM 116, a TLB miss occurs. In the system shown in FIG. 2, multiple virtual tags may map to one physical tag. For a TLB hit, the selected CAM entry designates an address in a TLB RAM 118 for a physical tag corresponding to a virtual tag 104. A physical tag is then retrieved from the TLB RAM 118. Each of four digital comparators 120 then compares the physical tag from the TLB RAM 118 to a physical tag 112 from the tag section 110. A matching pair of physical tags indicates through logic 122 which of four lines of data is selected by a multiplexer 124. For a particular index bit, there may not be a matching pair of physical tags, in which case a cache miss occurs.

Figure 3:
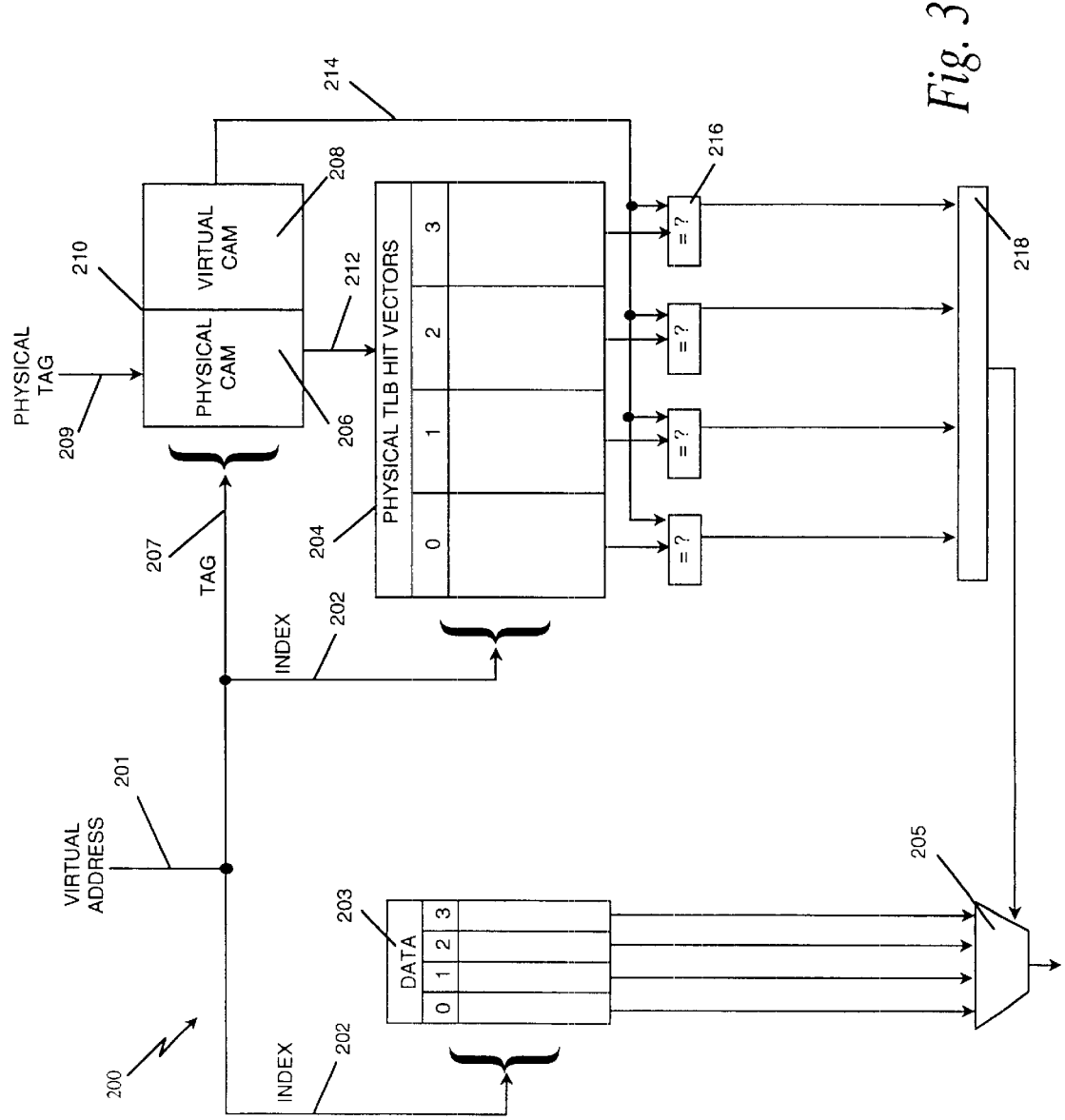
FIG. 3 is a block diagram of a prevalidated tag cache micro-architecture.

FIG. 3 illustrates a four-way set-associative cache 200. The cache 200 includes index bits 202, a data section 203 and multiplexer 205. A cache tag section 204 includes physical TLB hit tags corresponding to data lines. When a new line of data is placed in the cache 200, instead of the physical address tag being stored in the cache tag section 204, a vector 212 (called a physical TLB hit vector) is stored in the cache tag section 204.

In the cache 200, a TLB 210 has two CAMs, a physical CAM 206 containing physical tags and a virtual CAM 208 containing virtual tags. When a new virtual tag 207 is stored in the virtual CAM 208, a corresponding physical tag 209 is also available using the computer operating system and the corresponding physical tag 209 is stored in the physical CAM 206. A physical TLB hit vector 212 has a binary "1" corresponding to each location in the physical CAM 206 that has the physical tag 209. Upon entry of a new line into the cache 200, the physical TLB hit vector 212, indicating the location of all the instances in the physical CAM 206 of the physical tag 209 of the new line, is generated by the physical CAM 206 and stored into the cache tag section 204, at a row location determined by the index bits 202 and at a column location determined by a set placement algorithm.

For a cache access, a virtual tag 207 is used by the virtual CAM 208 to generate a virtual TLB hit vector 214. If there is a TLB miss, the virtual hit vector 214 is all binary "0s." If there is a TLB hit, the virtual TLB hit vector 214 has a single binary "1" indicating the location of the virtual tag 207 in the virtual CAM 208. Each virtual tag 207 in the TLB 210 must be unique.

For cache access, the index bits 202 select a set of four physical TLB hit vectors 212 in the cache tag section 204. Each of the four physical TLB hit vectors 212 in the cache tag section 204 is compared, using one of four comparators 216, to the virtual TLB hit vector 214 from the virtual CAM 208. For any given set of index bits 202, only one of four selected physical tags in the cache tag section 204 matches the virtual TLB hit vector 214 from the TLB 210 for a fixed page size. For a fixed page size, a single pair of matching "1s" in the four physical TLB hit vectors 212 then determines which data line is selected by the multiplexer 205. For a given set of index bits 202, if there are no matching "1s" in the four physical TLB hit vectors 212, a cache miss occurs.

In the cache 200, the physical tag from the TLB 210 is not retrieved for cache access. Eliminating the operation of retrieving the physical tag from the TLB 210 eliminates an operation that takes a substantial amount of time in the critical time path for the cache access. Because the cache 200 looks for a pair of matching logical "1s" to determine a match, the comparators 216 may be simple AND gates followed by a large fan-in OR gate.

Additional details related to prevalidated cache architectures are provided in co-pending U.S. patent application Ser. No. 08/955,821, filed on Oct. 22, 1997, now U.S. Pat. No. 6,014,732, entitled CACHE MEMORY WITH REDUCED ACCESS TIME, the disclosure of which is hereby incorporated by reference.

The micro-architecture illustrated in FIG. 3 includes a prevalidated tag cache. The prevalidation imposes restrictions on how the TLBs in the micro-architecture work if the computer micro-architecture is designed to maximize overall bandwidth while minimizing cache load latency. The prevalidated tag cache, for example, provides very fast access time for certain loads but the micro-architecture may be designed to restrict the translations between virtual and physical address and restrict the distribution of processing among the different cache levels. The micro-architecture may provide for fast integer loads and a high bandwidth for floating point loads, for example. That is, integer load data needs to have fast access timing but its working set size is generally small. To optimize integer load latency, some processors provide a small but fast first level cache. To provide virtual address translation and avoid address aliasing problems, some processors must access the TLB to provide a physical address for checking with the cache tags to determine if the data is present in the cache or not. To decrease the memory latency for fast integer data access, TLB size may be limited to a small number of entries (such as 16 to 32). This conflicts with the large number of entries required on processors with large cache structures that could require 256 or more TLB entries.

In a prevalidated cache tag system, such as that shown in FIG. 3, the TLB entries are logically used in the cache tag to identify the cache lines. When a TLB entry is removed, control is normally used to invalidate all the data in the prevalidated cache tag that is associated with the removed TLB entry. However, this action may slow processing since one TLB entry may map to much or all of the data cache. The TLB may then be continually swapping pages in and out of memory (i.e., thrashing) instead of supporting program execution.

Floating point data processing performance is usually limited by the memory bandwidth in and out of the floating point execution units. As opposed to integer load data accesses, which need a low latency, floating point accesses can usually be scheduled and can therefore endure a longer latency period. Likewise, while the integer data size is usually small, floating point data sets are usually very large. Ideally, TLB operations for floating point load/store operations will provide both high bandwidth and large data space translations (large number of TLB entries accessed). One design provides full bandwidth for all memory ports and a large but slower TLB for translation of floating point requests. In addition, memory port use may be unrestricted, allowing more load and store combinations.

The storing to or invalidating of a prevalidated integer load data cache may be difficult because the physical address of the cache line is not available in the cache tag, since the cache tag only holds prevalidated TLB hit information. In addition, since the TLB by its need for fast latency is small (e.g., 16 or 32 entries), the small integer load data cache TLB may not be used for store translations. One option is to separate out the store TLB access to a larger and slower TLB and provide a mechanism to invalidate the prevalidated integer load cache for store operations that may not be done in the first level cache (such as floating point stores) and for other invalidation actions such as flush caches and bus snoops.

Many computer instructions, such as floating point loads and stores, TLB support instructions, including purges, inserts and probes, and integer stores, do not need to immediately access a fast integer data cache. Some of the computer instructions may not have data residing in the fast integer load cache to avoid thrashing of the smaller cache. To support better use of the fast integer data cache, mechanisms may be provided to prevent this type of data from loading the integer data cache. To allow these instructions to bypass the integer cache, all exception information may be stored only in a large TLB so that the large TLB need only be accessed on, for example, all store operations, floating point loads, or TLB support instructions.

Finally, forcing all instructions through a first level TLB, which must be small to be fast, may cause pipeline stalls in the processor due to a higher TLB miss rate. Therefore, the micro-architecture shown in FIG. 3 may be adapted to use a parallel TLB structure that reduces the TLB miss rate and pipeline stalls.

The prevalidated cache tag system shown in FIG. 3 includes a prevalidated cache tag that contains tags holding bits that correspond to TLB entry slot numbers instead of holding physical or virtual addresses. To store into this type of cache and to invalidate the contents of this type of cache may be accomplished by the use of additional logic. The value of the prevalidated cache tag design is that load latency can be minimized. As a result, to maintain this load latency as low as possible, the design may avoid disrupting the load data path with store activities. In addition, cache stores may require physical address lookups and virtual address lookups. Adding these functions to the load data path might degrade load latency. By handling store operations in parallel with the load access path, load latency should remain unaffected. Likewise, store TLB entries can cause thrashing in the small, fast TLB used for the prevalidated tag cache. The store TLB operations may be handled in a parallel and noncritical structure.

In addition to parallel store operations, the system shown in FIG. 3 can be further optimized by invalidating cache lines that are to be removed from the prevalidated tag cache. The cache lines may be invalidated by communicating from the store/invalidate translation and lookup logic to the prevalidated cache tags to effectively invalidate each cache line. Cache tags in a prevalidated cache tag design may contain TLB hit bits rather than virtual or physical addresses. Therefore, when TLB entries change, cache lines associated with the TLB entry are invalidated. Additional logic can be added to the system shown in FIG. 3 to provide for invalidating the prevalidated cache tags for TLB changes.

If additional logic is added to the system shown in FIG. 3, cache lines may be invalidated due to a TLB change, but the cache lines may remain valid from the perspective of the store/invalidation control path. This situation does not cause problems for the load operations since load operations see the TLB invalidation effects. However, the situation can cause problems for stores and invalidations because stores and invalidations do not see the effects of the TLB invalidation. Another problem is encountered by potentially loading the same cache lines into multiple ways, or sections, of the prevalidated tag cache due to partial valid information because the cache line was already invalidated through a TLB update mechanism. This may reduce effectiveness of the cache by having redundant data in multiple ways, and may also cause problems for stores and updates. Stores may need to update more than one cache line to assure coherency. Invalidates may need to invalidate more than one cache line to assure coherency. A solution to the problem includes additional logic to remove stale cache lines from the prevalidated tag cache design shown in FIG. 3.

Figure 4:
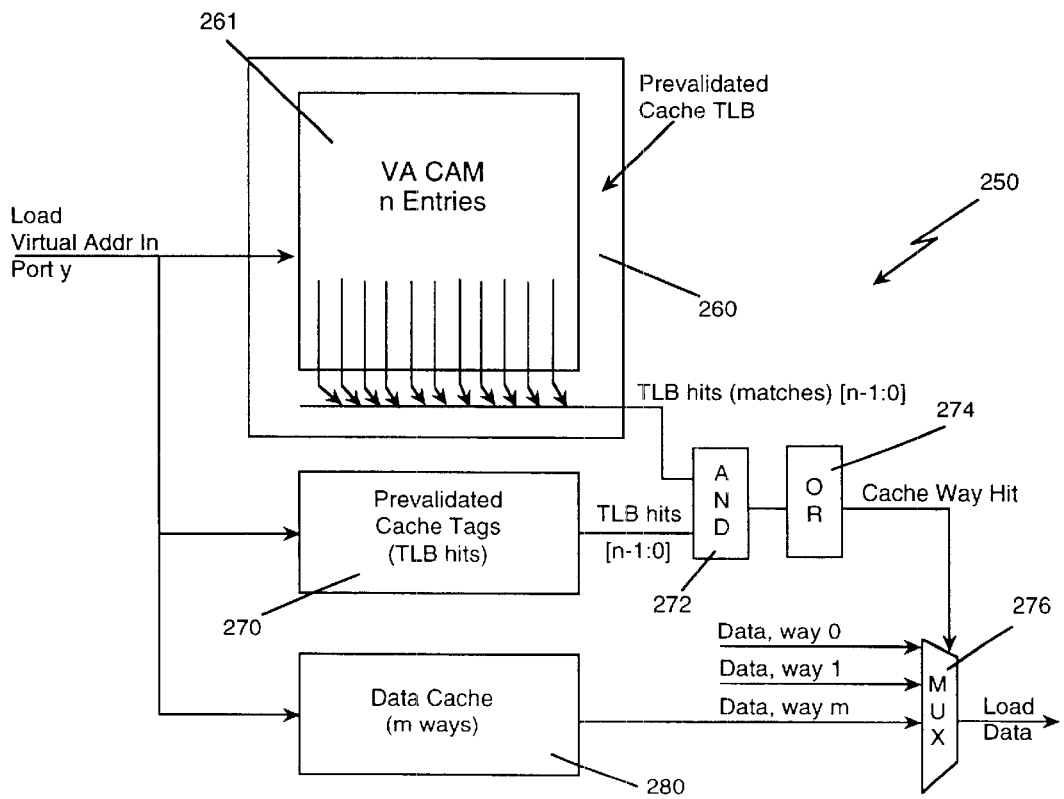
FIG. 4 is a block diagram of a prevalidated cache tag load data cache system.

FIG. 4 shows components of a prevalidated tag cache system 250 that is tuned for fast load latency. A small TLB 260 is provided with a virtual address (VA) CAM 261 that generates hit bits to a prevalidated cache tag. In parallel, the TLB hit bits that are stored in a prevalidated cache tag 270 are read according to an index field from an address generated by an instruction. The TLB hit bits from the VA CAM 261 and the prevalidated cache tag TLB hits are read and are ANDed and ORed in the AND circuit 272 and the OR circuit 274, respectively, to determine if a cache line is present in the cache. If a cache line is present in the cache, a cache way hit is generated and the output of the data cache 280 is multiplexed in multiplexer 276 to provide load data. Because the system 250 is tuned for fast virtual address load access, physically addressed loads can be supported by lower level cache accesses (not shown).

Figure 5:
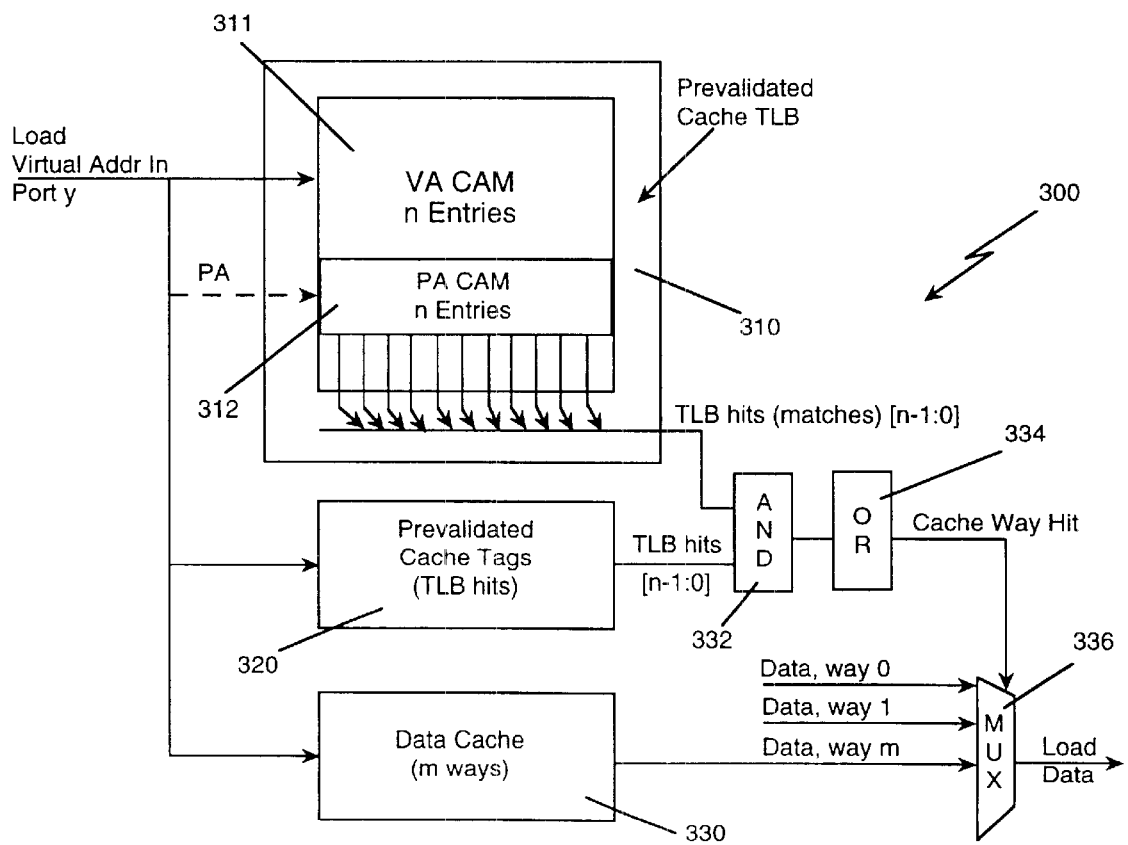
FIG. 5 is a block diagram of an expanded prevalidated cache system to cover store or invalidation operations in the prevalidated cache TLB.

Store updates can be supported by sending store instruction virtual address into the same address port as the loads. This operation will provide a cache way hit that would be used for a later store into the cache during a writeback pipeline stage. However, store instructions must be able to use physical addressing and either update or invalidate the existing cache line. FIG. 5 shows an expanded prevalidated cache system that is capable of handling the physical addressing of the store operations. The system 300 shown in FIG. 5 is similar to the system shown in FIG. 4. A prevalidated cache TLB 310 receives virtual addresses in memory port y and produces TLB hits. The prevalidated cache tag 320 produces TLB hits that are ANDed with the output of a VA CAM 311 and AND circuit 332 and are ORed in OR circuit 334 to produce a cache way hit. The cache way hit is used by multiplexer 336 to select the output of a data cache 330. The prevalidated cache TLB 310 includes a physical address CAM 312 so that physical address (PA) requests can be switched to the PA CAM 312 and the VA hit bits (now generated by a PA CAM) would compare with the tag as before. However, the addition of the PA CAM 312 to the prevalidated cache TLB 310 may adversely affect load access time. Further, store and invalidation TLB requirements may thrash the load TLB entries, causing more TLB misses and thus a lower TLB hit rate. Finally, store and invalidation operations take away from the load bandwidth provided by the prevalidated cache design, thereby reducing load operational bandwidth.

Figure 6:
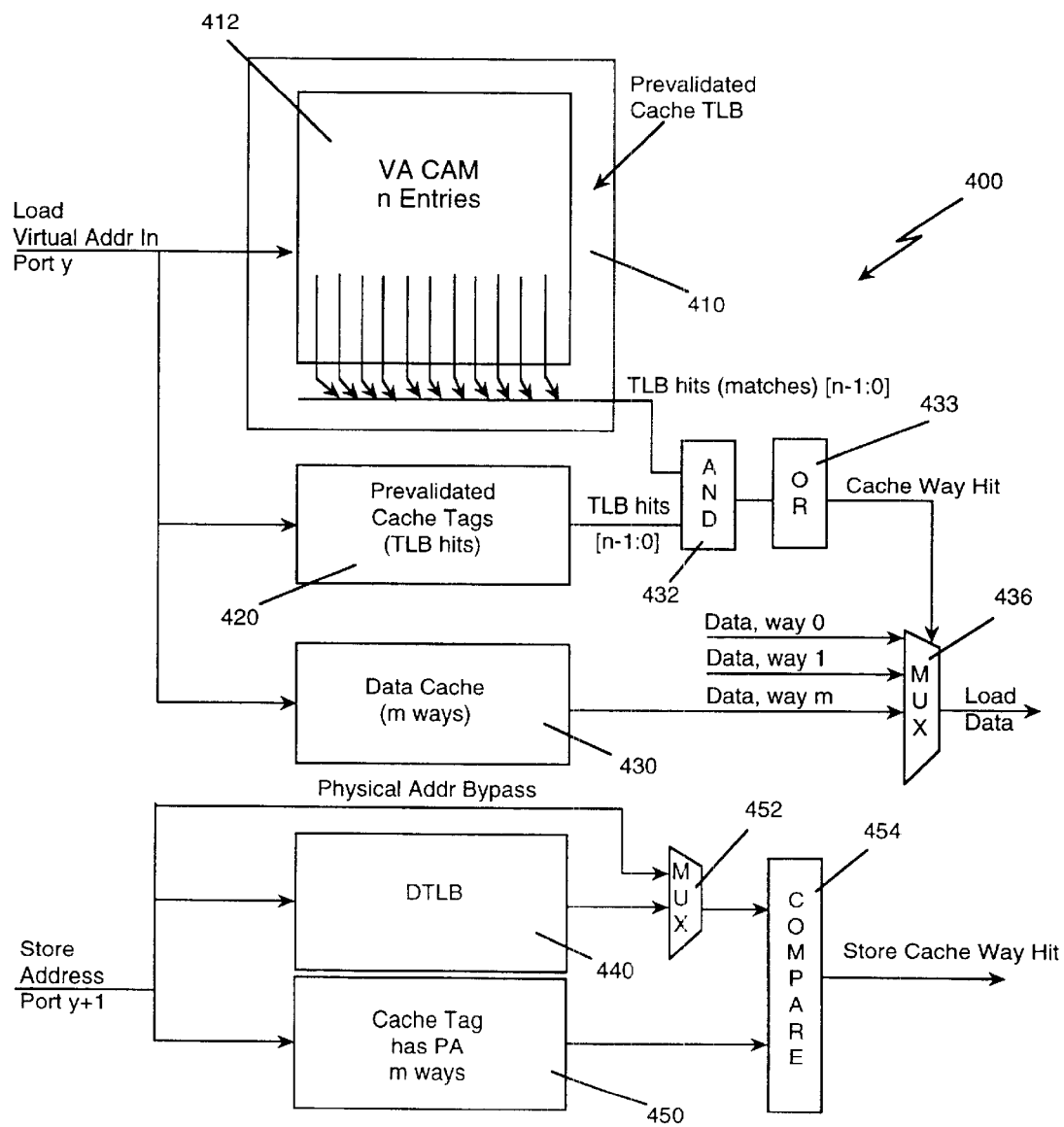
FIG. 6 is a block diagram of a prevalidated cache tag system with parallel store update.

The problems inherent in the system 300 shown in FIG. 5 can be overcome by the addition of a parallel TLB structure. FIG. 6 shows a prevalidated tag cache system 400 having such a parallel TLB structure. The system 400 includes a prevalidated cache TLB 410, including a VA CAM 412. As before, load virtual address information is provided in memory ports to the VA CAM 412 and to a prevalidated cache tag 420 and a data cache 430. The TLB hits from the VA CAM 412 compare to TLB hits from the prevalidated cache tags 420 and the cache way hit is used by multiplexer 436 to select the output of the data cache to provide load data.

A master TLB (DTLB) 440 is added in parallel with the prevalidated cache TLB 410. The DTLB 440 has a larger number of entries and is distinct from the prevalidated cache TLB 410. The DTLB 440 will hold all the TLB entries required for stores and other instructions. By not requiring the store and invalidation TLB entries to reside in the prevalidated cache 410, thrashing in the prevalidated cache TLB410 is reduced.

A parallel cache tag array 450 may be added. The cache tag array 450 holds physical addresses of the cache lines. The cache tag array 450 is functionally in parallel with the prevalidated cache tags 420 that hold the TLB hit bits. A physical address cache tag is read out of the cache tag array 450 in the same manner as for the prevalidated cache tags, using an index contained in the input address. The addition of the DTLB 440 includes a new address pipeline that is independent of the load address pipeline. The addition of this pipeline provides greater bandwidth for the cache without impacting load access latency. In operation, the store addresses are inputted to the DTLB 440 and the cache tag array 450 independent of operations in the load data pipelines. If the store address is a physical address, the address is bypassed around the DTLB 440 and is inputted into a physical address multiplexer 452. If the store address is a virtual address, then the DTLB 440 is accessed and the physical address is translated by the DTLB 440. The physical address from the store instruction is then compared with the physical address read out of the cache tag array 450. If the two addresses match, then a way hit is generated and the store update hardware (not shown) will update or invalidate the data cache in a later pipeline stage.

In addition to supporting store update operations, the system shown in FIG. 3 can accommodate invalidation of cache lines due to instructions or external requests by the addition of logic circuitry to carry out this function. Caches may need to be invalidated for many reasons, including eviction of a cache line from a processor due to a system bus request, eviction of a cache line from a processor due to a flush cache instruction stores or read-modify-write operations that are supported at another level of the cache, and hardware failure recovery operations. Since the prevalidated cache is primarily used to produce load results with a fast latency, any invalidation process should only affect the cache way hit generation for load operations. To provide this functionality, a new structure may be added to the prevalidated cache tags to provide a single valid bit per cache line that is used to signal a cache line valid state. A store valid bit may be set when a new cache line is written and cleared only for an invalidation operation. Since the store valid bit is part of the load cache way hit control an invalidation will block load hits on that cache line.

Figure 7:
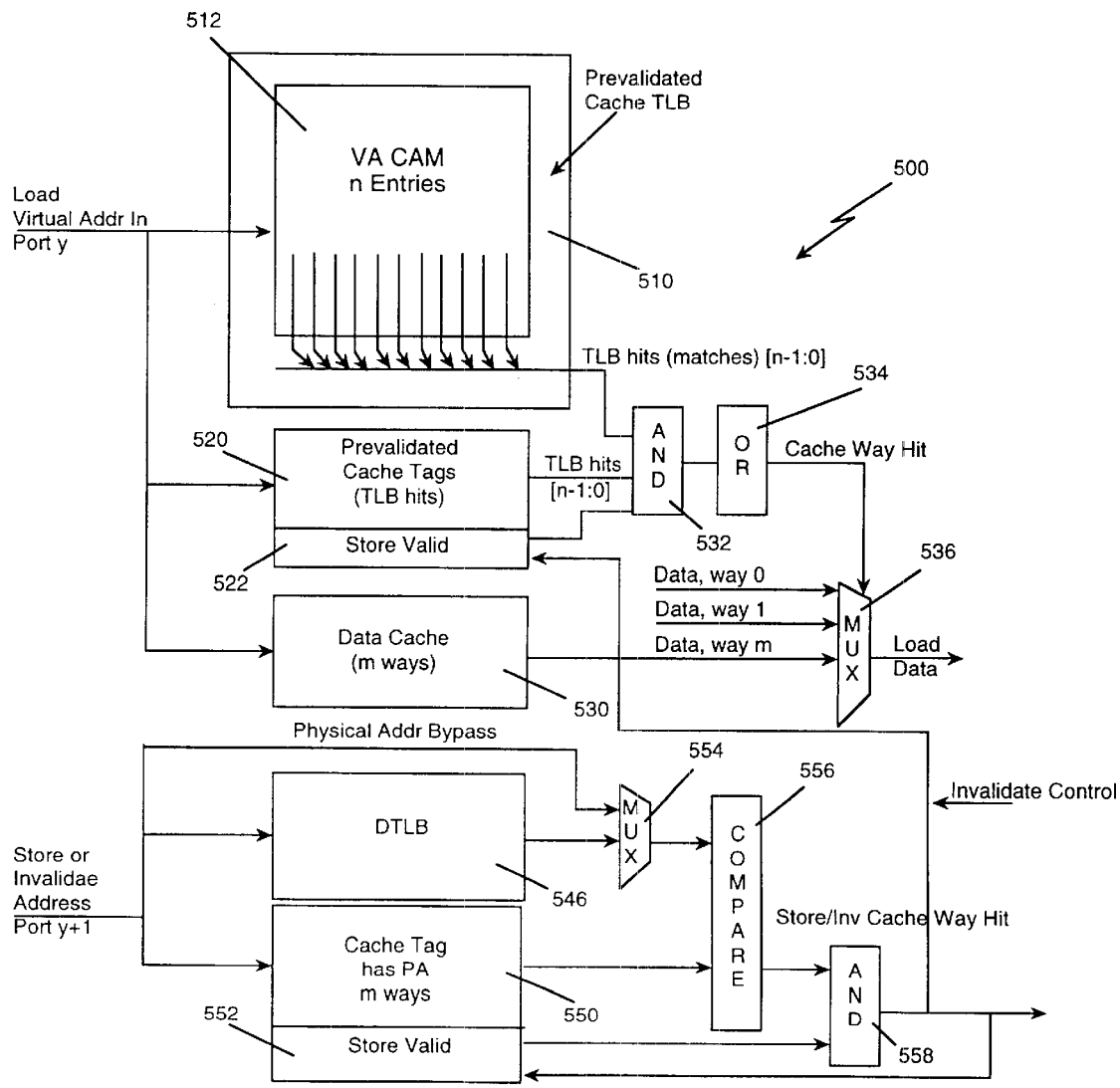
FIG. 7 is a block diagram of a prevalidated tag cache system with parallel store update and invalidation logic.

FIG. 7 is a block diagram of prevalidated cache tag system including additional logic for invalidation of a prevalidated cache tag. The system 500 includes a prevalidated cache TLB 510 having a VA CAM 512. A prevalidated cache tag 520 is also provided. Associated with the prevalidated cache tag 520 is a store valid module 522. A data cache 530 is also provided with the prevalidated cache TLB 510. The prevalidated cache TLB 510 receives load virtual address information in the memory port, such as port y and the VA CAM 512 executes compare operations to provide TLB hits. The prevalidated cache tag 520 also produces TLB hits read out of its memory. The output of the VA CAM 512 and the prevalidated cache tag are ANDed and ORed to produce a cache way hit, which is then used by the multiplexer 536 to select the output of the data cache 530.

An invalidation request is put on a store or invalidate address line (port y+1) and is translated in a DTLB 546 if it is a virtual address or bypassed around the DTLB 546 if the address is already a physical address. A cache tag array 550 is accessed and its physical address is compared with that of the store or invalidation instruction address. If the addresses match and the store valid bit for the cache tag array 550 is set, then a store/invalidate a cache way hit signal is generated out of the comparator network (556 and 558). The store/invalidate cache way hit will force the store valid bits in both the prevalidated cache tag 522 and the cache tag array 552 to be cleared for that cache line if an invalidation is required. Otherwise the hit information is used to update the data in the cache.

Figure 8:
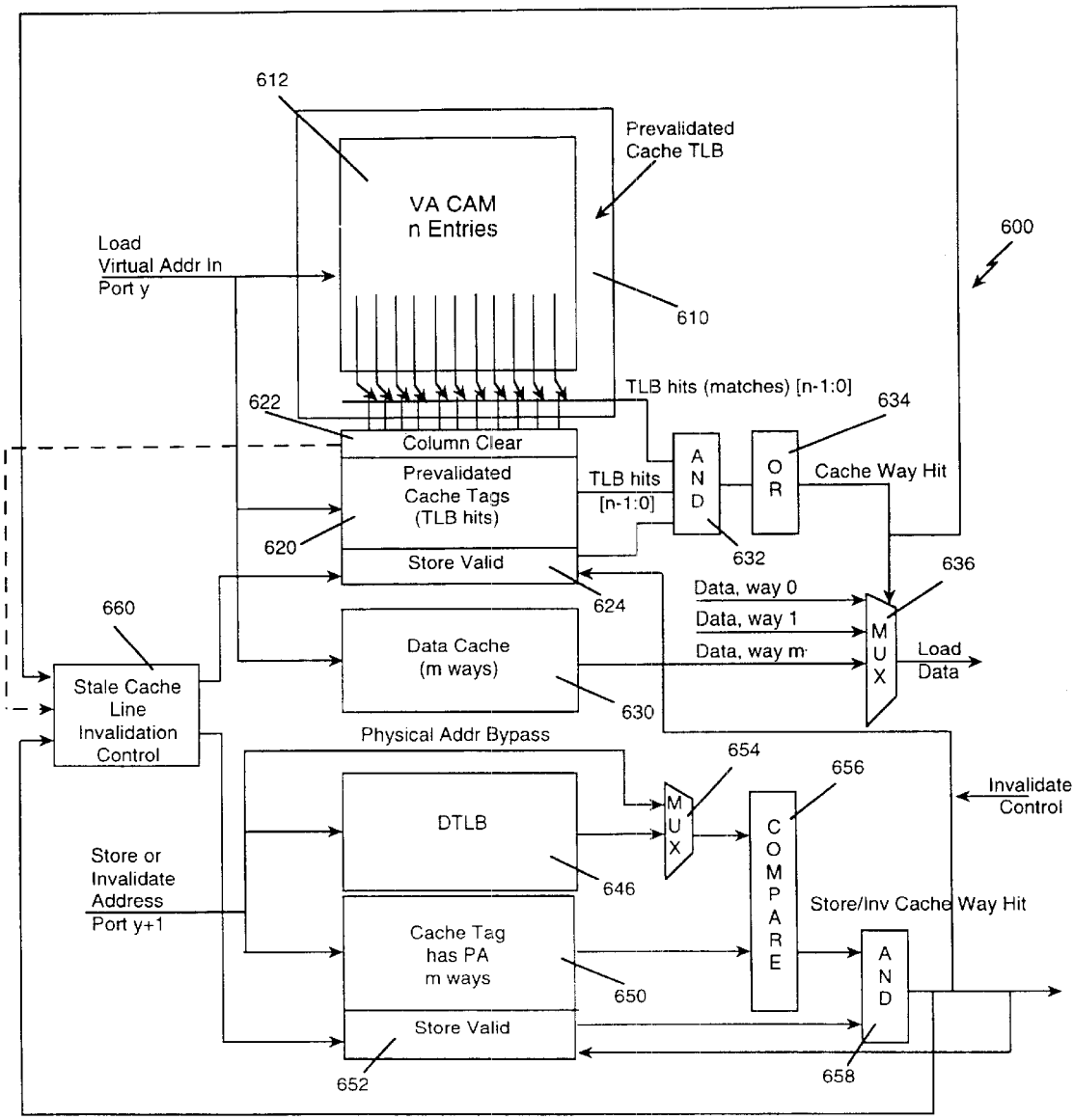
FIG. 8 is a block diagram of a prevalidated cache tag system with column clear logic and stale cache line removal logic.

The cache tags in a prevalidated cache tag design contain TLB hit bits rather than virtual or physical addresses. Therefore, when TLB entries change, all cache lines associated with the TLB entry may be invalidated. This invalidation may be accomplished by the addition of a logic circuit to the prevalidated cache tags. FIG. 8 shows a prevalidated cache tag system 600 including the additional logic circuit to provide for cache line invalidation when TLB entries change. As before, a prevalidated cache TLB 610 includes a VA CAM 612, a prevalidated cache tag 620 and a data cache 630. The prevalidated cache tag 620 includes a store valid module 624 and a column clear module 622. The output of the VA CAM 612 and the prevalidated cache 620 are ANDed in AND circuit 632 and ORed in OR circuit 634 to produce a cache way hit, which is used by the multiplexer 636 to select the data cache 630 output. The column clear module 622 will clear all n bits of the prevalidated cache tag for one or more TLB slot entry positions.

Also included in the micro-architecture 600 is a parallel, master TLB (DTLB) 646, a physical address cache tag 650 and a store valid bit module 652. The DTLB 646 and the physical address cache tag 650 function in a manner similar to the DTLB 440 and the cache tag array 450 shown in FIG. 6. A multiplexer 654, comparator 656 and AND circuit 658 receive outputs from the DTLB 646, the physical address cache tag 650 and the store valid bit module 652 and a physical address bypass to produce a store/invalidate cache way hit.

When a new prevalidated cache TLB entry is inserted, meaning that the TLB entry that was previously in a TLB slot has been invalidated, or whenever a TLB entry is invalidated for other reasons, such as aliasing or TLB maintenance instructions, the column clear module 622 operates. In these cases, the TLB 610 will set TLB hit bits for all TLB slots that are to be invalidated (several TLB entries may be invalidated during one cycle). The prevalidated cache tag 620 will receive a column clear control signal and will look at the TLB hit signals from the prevalidated cache TLB 610 and will clear all the TLB hit bits in the prevalidated cache tag 620 for the TLB slots that are indicated. This operation may invalidate one or many cache lines.

The micro-architecture shown in FIG. 8, and discussed above, will function to invalidate prevalidated cache tags, but will not invalidate physical address cache tags. Stale cache lines are cache lines that are invalidated by a column clear, but remain. valid for the store/invalidation ports (the store valid bits 624, 652). The stale cache lines may be removed by a hardware cleansing function performed after each TLB insert or purge. This function would walk through the indexes of the cache tags and would check each index for an invalid entry in the prevalidated cache tags and a valid entry in the physical address cache tags. If such a condition was found, then the store valid bits (624, 652) would be cleared for that entry.

Alternatively, hardware may be provided to invalidate the store valid bits whenever a TLB bit in the prevalidated cache tags is cleared due to a column clear operation. This would require detection of a column clear function. This function may also require ORing the multiple bits (up to m) due to the fact that multiple TLB slots can be cleared during one cycle. In addition, this function would also require connecting this information to each index row of the store valid bits in both the prevalidated cache tag and the physical address cache tag. This method could impose significant wiring complexity.

To minimize wiring complexity, the cleansing operations may be performed on one index location at a time when that index is being loaded with a new cache line. A stale cache line control 660 may be added to the micro-architecture 600 to clear stale cache lines. The stale cache line control 660 receives cache way hit information and optionally column clear information and provides signals to the store valid bit modules 624, 652. When a cache line fill (i.e., loading the cache with a new cache line) is being processed in the cache, the address of that cache line is sent through the physical address cache tag 650 to determine if the cache line is stale in any of the cache ways that are not being loaded with the new line. If there is a hit on any of the other cache ways, then such a hit means that the same cache line being filled is also residing in an other cache way as a stale line. When this condition is detected, the stale cache line control 660 will invalidate the stale cache line as it would a normal invalidation operation, by clearing the store valid bits in both the store valid bit modules 624 and 652.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed:

1. In a computer architecture having a prevalidated tag cache, an apparatus for updating stores and for invalidating and removing stale cache lines, comprising:
    a first translation lookaside buffer (TLB) structure, comprising:
        an integer load TLB that receives a virtual address and provides a TLB virtual hit;
        a prevalidated cache tag array that receives the virtual address and provides a TLB physical hit,
        a first store valid bit array coupled to the prevalidated cache tag array, and
        a data cache that receives the virtual address and provides a cache data; and
    a second TLB structure in parallel with the first TLB structure, comprising:
        a master TLB in parallel with the integer load TLB that receives store and other instruction address information and provides first physical address information,
        a physical address tag array in parallel with the master TLB, the physical address tag array receiving the store or other instruction address information, storing the address information in indexes, and providing second physical address information,
        a second store valid bit array coupled to the physical address tag array, and
        a comparator that compares the physical address information provided by the physical address tag array and the master TLB and generates a store/invalid cache hit upon an occurrence of a match between the first and the second physical address information, wherein the first and the second store valid bit arrays signal cache lines to be invalidated or store data to be updated.

2. The apparatus of claim 1, further comprising a column clear module coupled to the prevalidated cache tag array, wherein the column clear module receives information related to specific TLB slots to invalidate and directs the invalidation of all TLB hits in the prevalidated cache tag array associated with the specific TLB slots.

3. The apparatus of claim 2, wherein the column clear module supplies an invalidate signal to the indexes in the physical address tag array.

4. The apparatus of claim 1, wherein the second TLB structure comprises a physical address bypass, wherein when the address information is physical address information, the bypass provides the physical address information to the comparator.

5. The apparatus of claim 1, further comprising a stale cache line control, wherein when a cache line fill is being processed in a cache, the control sends an address of the cache line to the physical address tag array, and wherein, when the cache line is detected in the cache, the control clears store valid bits associated with the cache line in the prevalidated cache tag and the physical address tag array.

6. An apparatus for invalidating cache lines and clearing stale cache lines in a computer architecture having a prevalidated cache tag, comprising:
    a translation lookaside buffer (TLB) that receives virtual address information and provides TLB hit bits, the TLB hit bits related to a physical address corresponding to the virtual address information;
    a prevalidated cache tag array that receives the virtual address information and produces the TLB hit bits;
    comparison logic that compares the TLB hit bits to produce a cache way hit signal; and
    a valid bit module that sets a valid bit when a cache line is written and clears the valid bit upon the occurrence of an invalidation operation.

7. The apparatus of claim 6, further comprising a master TLB structure operating in parallel with the TLB that provides store or invalidate operation cache way hits, wherein the TLB receives virtual address information related to loads.

8. The apparatus of claim 6, wherein the prevalidated cache tag array comprises a column clear module that provides a column clear signal for selected TLB hit bits.

9. The apparatus of claim 8, wherein the selected hit bits are selected based on one of a new TLB entry, address aliasing, and TLB maintenance functions.

10. The apparatus of claim 8, wherein the master TLB structure comprises a physical address cache tag array having a store valid bit module that sets a valid bit when a cache line is written and clears the valid bit upon the occurrence of an invalidation operation, and wherein the column clear module provides the column clear signal to clear index positions in the physical address tag array.

11. A method for updating store data, invalidating cache lines and removing stale cache lines in a computer architecture having a prevalidated cache tag array, comprising:
    receiving virtual address information for integer loads in a first translation lookaside buffer (TLB);
    receiving the virtual address information in the prevalidated cache tag array;
    receiving the virtual address information in a data cache;
    providing a TLB virtual hit from the first TLB;
    providing a TLB physical hit from the prevalidated cache tag array;
    providing a physical address corresponding to the virtual address information;

receiving address information for integer and floating point operations in each of a master TLB parallel to the first TLB and a physical address tag array;

providing first physical address information from the master TLB;

storing the address information in indexes in the physical address tag array;

providing second physical address information from the physical address tag array;

comparing the first and the second physical address information for a match; and upon the occurrence of the match, generating signals indicating cache lines to be invalidated or store data to be updated.

12. The method of claim 11, further comprising:

when a cache line fill is being processed in a cache, sending an address of the cache line to the physical address tag array; and when the cache line is deleted in the cache, clearing store valid bits associated with the cache line in the prevalidated cache tag and the physical address tag array.

* * * * *